United States Patent [19]

Hasegawa et al.

[11] Patent Number: 4,505,882

[45] Date of Patent: Mar. 19, 1985

[54] PROCESS FOR MANUFACTURING URANIUM DIOXIDE POWDER

[75] Inventors: Shin-ich Hasegawa; Eiji Takano; Masao Sekine, all of Ibaraki, Japan

[73] Assignee: Mitsubishi Nuclear Fuel Co., Ltd., Tokyo, Japan

[21] Appl. No.: 478,372

[22] Filed: Mar. 24, 1983

[30] Foreign Application Priority Data

Sep. 14, 1982 [JP] Japan .................................. 57-160426

[51] Int. Cl.³ .......................................... C01G 43/025
[52] U.S. Cl. .................................... 423/261; 252/643; 264/0.5
[58] Field of Search ........................ 264/0.5; 252/643; 423/261

[56] References Cited

U.S. PATENT DOCUMENTS

| | | | |
|---|---|---|---|
| 3,941,870 | 3/1976 | Ekstrom et al. | 423/261 |
| 3,970,581 | 7/1976 | Jeter et al. | 423/261 |
| 4,079,120 | 3/1978 | Cole et al. | 423/261 |
| 4,120,936 | 10/1978 | De Luca et al. | 423/261 |

*Primary Examiner*—Leland A. Sebastian
*Attorney, Agent, or Firm*—Edward J. Brenner

[57] ABSTRACT

A process for manufacturing uranium dioxide powder which comprises forming fine uranium dioxide powder having a high sinterability and coarse uranium dioxide powder having a low sinterability continuously in one process by changing periodically the precipitation condition of the ammonium diuranate under the same condition of calcining and reducing of the ammonium diuranate. The thus obtained mixture of these uranium dioxide powders is suitable for uranium dioxide pellet which is a fuel of nuclear power reactor.

4 Claims, 5 Drawing Figures

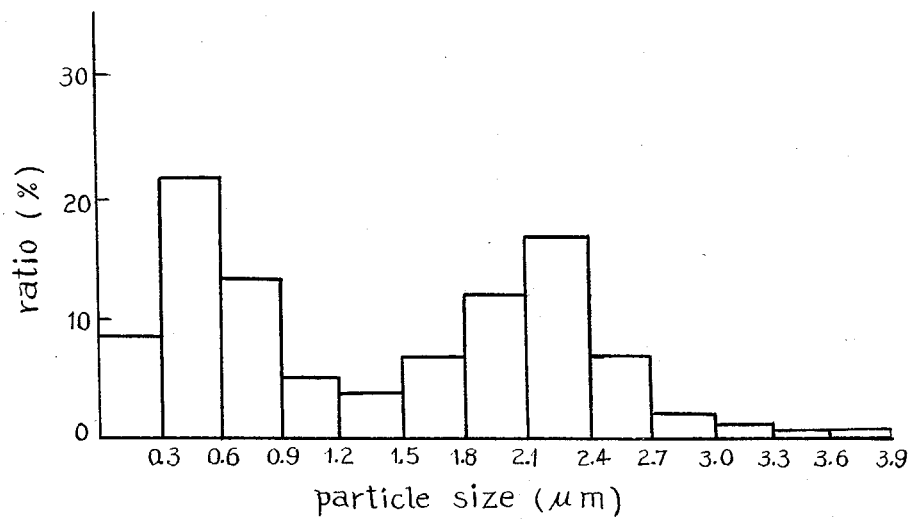

PROCESS FOR MANUFACTURING URANIUM DIOXIDE POWDER

BACKGROUND OF THE INVENTION

The present invention relates to a process for manufacturing uranium dioxide powder from uranium hexafluoride using a wet process, which is suitable as a material for a firm pellet.

Manufacturing of uranium dioxide powder, a material for fuel of nuclear power reactor is carried out by ADU process as follows:

Namely, solid uranium hexafluoride ($UF_6$) is heated to vaporize, the $UF_6$ gas is hydrolyzed with deionized water to uranyl fluoride ($UO_2F_2$) solution. The $UO_2F_2$ solution is added with ammonium hydroxide to form ammonium diuranate (ADU) precipitate. This slurry is filtered, then there is obtained a cake. The cake is washed, dried and milled. The obtained ADU powder is supplied to a calcining and reducing kiln to manufacture uranium dioxide powder. The uranium dioxide powder manufactured by this process has generally a particle size of about 0.1–3 $\mu$m and an example of the particle size distribution thereof is illustrated in FIG. 1.

Thus, an $UO_2$ pellet, a fuel of nuclear power plant is manufactured from the uranium dioxide powder as a raw material.

Therefore, in that case, the pellet is required to have a high sinterability and a sufficient strength and not to be chipped and cracked in the surface. The sinterability and formability of these uranium dioxide powder depend largely on the properties thereof. Therefore, various investigations have been directed to improve the properties of $UO_2$ powder. For example, in the official gazette of Patent Publication No. 12026/1967, it is disclosed that when coarse and inactive $UO_2$ powder having a low sinterability and fine and active $UO_2$ powder having a high sinterability are mixed in a definite ratio, the obtained mixed $UO_2$ powder is minimum in densification during sintering and is suitable as a raw material for manufacturing a pellet having a sufficiently strength.

However, when $UO_2$ powder is manufactured and regulated by the above mentioned process, it is required the coarse powder having a low sinterability and the fine powder having a high sinterability is separately manufactured and these two kinds of the powder are mixed uniformly, thereby making a process for manufacturing $UO_2$ powder complicated. The present inventors have turned their attention to the invention disclosed above and have succeeded in accomplishing the present invention by dissolving the defects thereof.

BRIEF SUMMARY OF THE INVENTION

The object of the present invention is to provide a process for manufacturing uranium dioxide powder in which a manufactured uranium dioxide powder is a raw material suitable for a firm pellet.

According to the invention, there is provided: In the process for manufacturing uranium dioxide powder which comprises hydrolyzing uranium hexafluoride into uranyl fluoride, adding to said uranyl fluoride with ammonium hydroxide to precipitate ammonium diuranate, and calcining and reducing said precipitated ammonium diuranate into uranium dioxide, improvements comprising forming fine uranium dioxide having a high sinterability and coarse uranium dioxide having a low sinterability continuously and alternately in the coarse of one process and mixing two kinds of said uranium dioxide by changing at least one of the precipitation conditions of said ammonium diuranate with a time period corresponding to 1/12–½ of a time required for forming a lot under the same condition of calcining and reducing of said ammonium diuranate.

The present invention is based on the findings of the present inventiors in their investigation described above that in the process for manufacturing $UO_2$ powder by way of ADU from $UF_6$, the precipitation condition of ADU is a manufacturing factor which has the strongest influence upon the $UO_2$ powder. Namely, the present invention is an improvement of the disclosed above.

The above and other objects, advantages and features of the present invention will be more apparent from the following description taken in connection with the accompanying drawing wherein:

FIG. 1 is a general particle size distribution curve of $UO_2$ powder obtained by conversion of $UF_6$ using ADU process, FIG. 2 is a particle size distribution curve of active $UO_2$ powder manufactured when the liquid temperature of ADU precipitator is controlled to be relatively low (25°–27° C.), FIG. 3 is a particle size distribution curve of inactive $UO_2$ powder manufactured when the liquid temperature of ADU precipitator is controlled to be relatively high (48°–50° C.), FIG. 4 is a variation curve of the liquid temperature of ADU precipitator when the liquid temperature thereof is controlled by a definite period to manufacture active $UO_2$ powder and inactive $UO_2$ powder continuously and alternately, FIG. 5 is a particle size distribution curve having two peaks of $UO_2$ powder manufactured when the liquid temperature of ADU precipitator is controlled in the same manner as in FIG. 4.

DETAILED DESCRIPTION OF THE INVENTION

The present invention, as described above, can manufacture coarse powder having a low sinterability and fine powder having a high sinterability in mixed state continuously and alternately in one process by changing at least one selected from the group consisting of a liquid temperature of a precipitator, an agitation velocity of the precipitator, and $NH_3/U$ mol ratio of ammonium hydroxide to $UO_2F_2$ solution supplied to respectively the precipitator of the ADU precipetation conditions which are relatively easy to be controlled with a time period corresponding to 1/12–½ of time required for forming a lot.

$UF_2$ is heated to be vaporized. The $UF_6$ gas is absorbed with deionized water to be $UO_2F_2$ solution. Further, the $UO_2F_2$ solution reacts on ammonium hydroxide to form ADU. In this reaction, when the liquid temperature is high, there is formed a relatively coarse and inactive ADU particle, and when the liquid temperature is low, there is formed a fine and active ADU particle. After the ADU is filtered and dried, it is calcined and reduced to $UO_2$ powder. The configuration of the ADU formed in precipitation is kept as it is after calcining and reducing thereof. When ADU is calcined and reduced under the same condition, the coarse ADU particle becomes inactive $UO_2$ powder and the fine ADU particle becomes active $UO_2$ powder.

Figure 1:
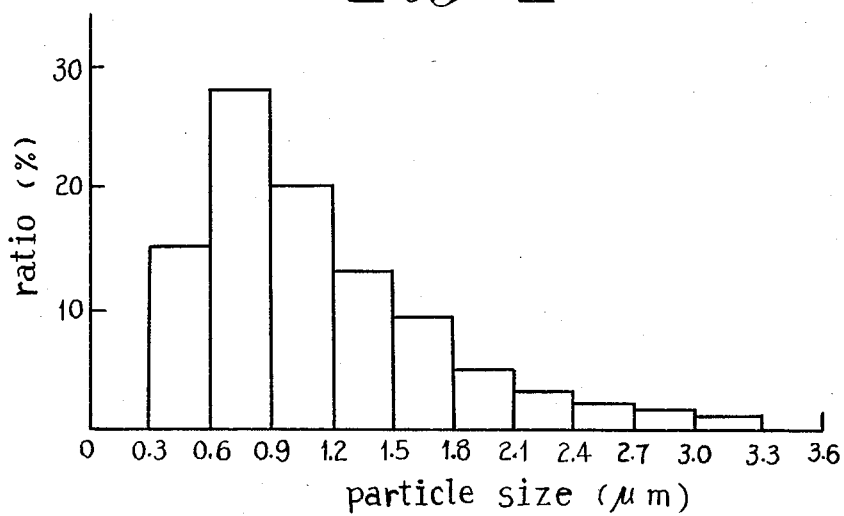
Figure 2:
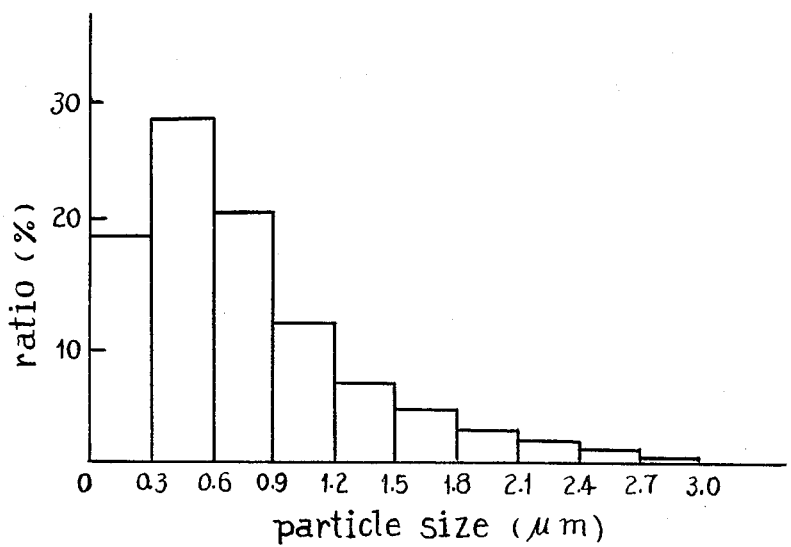

In the present invention, the liquid temperature of the precipitator controlled periodically ranges from 25° C. to 50° C. When the liquid temperature of the precipitator is kept at 26±1° C., there can be manufactured fine and active $UO_2$ powder having an average particle size of 0.4–0.7 μm. The particle size distribution curve of this case is formed as shown in FIG. 2.

Figure 3:
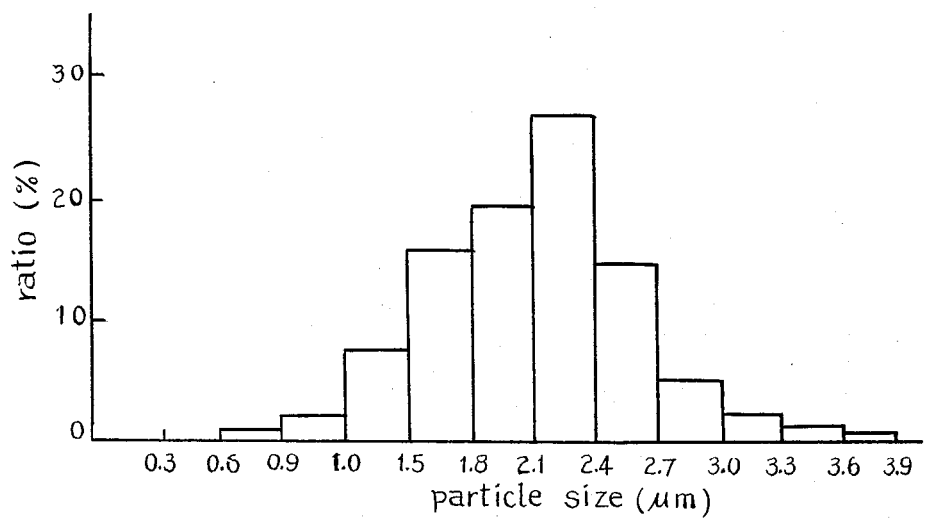

Further, when the liquid temperature of the precipitator is kept at 49±1° C., there is obtained coarse and inactive $UO_2$ powder having an average particle size of 2–2.5 μm and the particle size distribution curve thereof is illustrated in FIG. 3.

Figure 4:
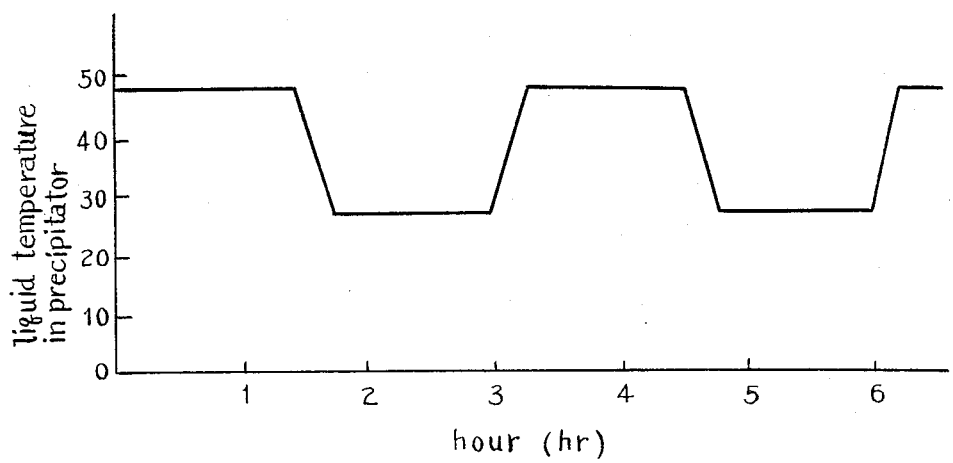

Therefore, by controlling the liquid temperature of the precipitator with a definite period, for example, in the same manner as in FIG. 4, there can be manufactured active ADU powder and inactive ADU powder continuously and alternately. These ADU powders are mixed with each other in passing through steps of drying, calcining and reducing, milling and charging, and in the case where the $UO_2$ powders are further supplied into a container to be mixed more uniformly. The thus manufactured $UO_2$ powder, as shown in FIG. 5, has a particle size distribution curve having two peaks and becomes $UO_2$ powder which is a suitable raw material for manufacturing a firm $UO_2$ pellet.

When the liquid temperature of the precipitator is less than 25° C., the powder is not fine in proportion to its cooling, and when more than 50° C., the heat of reaction alone is not sufficient and an external heating is required. Therefore, it is suitable to control the liquid temperature of the precipitator within the range of 25° C.–50° C. using a cooling apparatus.

When precipitation of ADU is formed, factors which have an influence on particle size of ADU precipitated and are relatively easy to be controlled are an agitation velocity of the precipitator and $NH_3/U$ mol ratio of ammonium hydroxide and $UO_2F_2$ solution introduced into the precipitator with the exception of the liquid temperature. As for the agitation velocity of the former, it is preferable to be controlled periodically in the range of 100 rpm to 400 rpm. When the agitation velocity is less than 100 rpm, a sufficient agitation effect can not be obtained, while when more than 400 rpm, coarse and inactive powder is not formed in proportion to its large agitation velocity. Further, as for the $NH_3/U$ mol ratio of the latter, it is preferably in the range of 16 to 32. The larger the $NH_3/U$ mol ratio is, the finer the ADU particle is formed. When the $NH_3/U$ mol ratio is less than 16, it is likely to lead to the formation of a part of the reactant which does not react, while when the $NH_3/U$ mol ratio is more than 32, $NH_3$ becomes largely excessive.

The three precipitation conditions of ADU as mentioned above are relatively easy to be controlled. When the liquid temperature of the precipitator is periodically controlled, it can be performed by passing through a heat exchanger $UO_2F_2$ solution and ammonium hydroxide which are supplied to the precipitator and are previously cooled to a definite temperature, or by programming to change periodically the temperature of solvent of a cooling apparatus which cools the precipitator itself. As for the agitation velocity of the ADU precipitator and the $NH_3/U$ mol ratio, the former can be periodically changed by changing a rotation frequency thereof and the latter can be changed periodically by changing periodically a flow rate ratio of $UO_2F_2$ solution and ammonium hydroxide introduced to the ADU precipitator, using relatively simple sequential control respectively.

When the period of the ADU precipitation conditions which are changeable with a definite cycle is too short, $UO_2$ powder having a particle size distribution curve with two peaks can not be obtained. Therefore, it is suitable to change the precipitation conditions with a time period corresponding to 1/12–½ of a time required for forming a lot. The period is preferable to be more than 30 minutes.

The present invention, as described above, does not necessitate to manufacture or regulate fine and active $UO_2$ powder and coarse and inactive $UO_2$ powder in separate processes and mix these two kinds of $UO_2$ powder mechanically and can manufacture $UO_2$ powder by one continuous conversion process via ADU from $UF_6$, which is suitable for manufacturing a firm pellet, bringing about a remarkable reduction of labor.

Further, the present invention can as another effect provide a process which can control easily the particle size, the particle size distribution of $UO_2$ powder and the ratio of active powder and inactive powder and can manufacture optimum powder for manufacturing $UO_2$ pellet which is a nuclear fuel. Therefore, the present invention is very useful for manufacturing a nuclear fuel.

The present invention will be understood more readily with reference to the following examples. The examples, however, are intended to illustrate the present invention and are not construed to limit the scope of the present invention.

EXAMPLE 1

$UF_6$ is vaporized, and the $UF_6$ gas is absorbed with deionized water into $UO_2F_2$ solution of 140 U/l. The $UO_2F_2$ solution reacts with ammonium hydroxide of 28 weight % in a precipitator with a cooling device. At that time, the liquid temperature of the presipitator is controlled to be at 27° C. in the low temperature side thereof and at 48° C. in the high temperature side thereof with 90 minute period. Further, at that time, the $NH_3/U$ mol ratio is set at 24 and the agitation velocity of the precipitator at 200 rpm. These are fixed.

EXAMPLE 2

$UF_6$ is vaporized, and the $UF_6$ gas is absorbed with deionized water into $UO_2F_2$ solution of 140 U/l. The $UO_2F_2$ solution reacts with ammonium hydroxide of 28 weight % in a precipitator with a cooling device. At that time, the agitation velocity of the precipitator is set at 120 rpm in the low speed side and at 350 rpm in the high speed side with 60 minute period. Further, at that time, $NH_3/U$ mol ratio is set at 18 and the liquid temperature of the precipitator at 43° C., and these conditions are fixed.

After the ADU slurry manufactured by the conditions described above is filtered and dried, it is calcined and reduced at 680° C. to be about 500 kg of $UO_2$ powder. The $UO_2$ powder is charged to the container to be mixed by rotation. The thus obtained $UO_2$ powder has a particle size distribution with two peaks and an average particle size thereof is 0.93 μm.

$UO_2$ pellet obtained by sintering the $UO_2$ powder at 1780° C. has a density of 95.5% and is firm, and the surface thereof is neither chipped nor cracked.

EXAMPLE 3

$UF_6$ is vaporized and the $UF_6$ gas is absorbed with deionized water to be an $UO_2F_2$ solution of 140 g U/l. It reacts with ammonium hydroxide of 28 weight % in the precipitator with a cooling device. At this time, $NH_3$/U mol ratio is alternated at 18 for the low mol ratio side and at 30 for the high mol ratio side with 2 hour period by changing the respective flowing amount of the $UO_2F_2$ solution and the ammonium hydroxide introduced to the precipitator. Then, the liquid temperature of the precipitator is set at 42° C. and the agitation velocity thereof at 200 rpm. These conditions are fixed.

After the ADU slurry manufactured by the process described above is filtered and dried, it is calcined and reduced at 690° C. to be about 500 kg of $UO_2$ powder. Then $UO_2$ powder is charged into the container and mixed by rotation. The $UO_2$ powder shows a particle size distribution with two peaks and has an average particle size of 0.95 $\mu$m. $UO_2$ pellet obtained by sintering the $UO_2$ powder at 1780° C. has a density of 95.0% and is firm. The surface thereof is neither chipped nor cracked.

EXAMPLE 4

$UF_6$ is vaporized and the $UF_6$ gas is absorbed with deionized water to be an $UO_2F_2$ solution of 140 g U/l. It reacts with ammonium hydroxide of 28 weight % in a precipitator with a cooling device. At this time, the precipitation conditions for manufacturing active powder are set as follows:

(1) the liquid temperature of the precipitator is 30° C.,
(2) the agitation velocity thereof is 150 rpm,
(3) $NH_3$/U mol ratio is 27.

On the other, the precipitation conditions for manufacturing inactive powder are set as follows:

(1) the liquid temperature of the precipitator is 45° C.,
(2) the agitation velocity thereof is 300 rpm,
(3) $NH_3$/U mol ratio is 20.

These two groups of the precipitation conditions are changed with 90 minute period. After the ADU slurry manufactured by the conditions described above is filtered and dried, it is calcined and reduced at 680° C. to be $UO_2$ powder. The $UO_2$ powder of about 500 kg is charged into the container to be mixed by rotation. The thus obtained $UO_2$ powder shows a particle size distribution with two peaks and an average particle size thereof is 0.92 $\mu$m.

$UO_2$ pellet obtained by sintering the $UO_2$ powder at 1730° C. has a density of 95.3% and is firm, and the surface thereof is neither chipped nor cracked.

What is claimed is:

1. In the process for manufacturing uranium dioxide powder which comprises hydrolyzing uranium hexafluoride into uranyl fluoride, adding to said uranyl fluoride with ammonium hydroxide to precipitate ammonium diuranate, and calcining and reducing said precipitated ammonium diuranate into uranium dioxide, improvements comprising forming fine uranium dioxide having a high sinterability and coarse uranium dioxide having a low sinterability continuously and alternately in the course of one process and mixing two kinds of said uranium dioxides by changing at least one of the precipitation conditions of said ammonium diuranate with a time period corresponding to 1/12-½ of a time required for forming a lot under the same condition of calcining and reducing of said ammonium diuranate.

2. A process for manufacturing uranium dioxide powder as claimed in claim 1 wherein said liquid temperature in said precipitator is in the range of 20° C. to 50° C.

3. A process for manufacturing uranium dioxide powder as claimed in claim 1 wherein said agitation velocity of said precipitator is in the range of 100 rpm to 400 rpm.

4. A process for manufacturing uranium dioxide powder as claimed in claim 1 wherein said $NH_3$/U mol ratio of uranyl fluoride solution and ammonium hydroxide introduced respectively into said precipitator is in the range of 16 to 32.

* * * * *